United States Patent
Silvers et al.

(10) Patent No.: US 7,713,365 B2
(45) Date of Patent: May 11, 2010

(54) WATER BASED AEROSOL ADHESIVE

(75) Inventors: Ford Silvers, Calhoun, GA (US); Mike D. Whitaker, Chatsworth, GA (US)

(73) Assignee: Interlock Industries, Inc., Chattanooga, TN (US)

( * ) Notice: Subject to any disclaimer, the term of this patent is extended or adjusted under 35 U.S.C. 154(b) by 24 days.

(21) Appl. No.: 12/192,156

(22) Filed: Aug. 15, 2008

(65) Prior Publication Data

US 2009/0065121 A1    Mar. 12, 2009

Related U.S. Application Data

(63) Continuation of application No. 10/474,384, filed on Oct. 9, 2003, now Pat. No. 7,427,644.

(51) Int. Cl.
| | |
|---|---|
| B65D 83/00 | (2006.01) |
| C08L 9/06 | (2006.01) |
| C08L 49/00 | (2006.01) |

(52) U.S. Cl. .................. 156/71; 516/7; 516/8; 516/8.1; 524/903

(58) Field of Classification Search ...................... 516/7, 516/8, 8.1; 524/903; 156/71
See application file for complete search history.

(56) References Cited

U.S. PATENT DOCUMENTS

| | | | |
|---|---|---|---|
| 3,578,622 A | 5/1971 | Brown et al. | |
| 3,912,666 A | 10/1975 | Spitzer et al. | |
| 4,036,673 A | 7/1977 | Murphy et al. | |
| 4,731,402 A | 3/1988 | Penzel et al. | |
| 4,764,548 A | 8/1988 | Hoppe et al. | |
| 4,968,373 A | 11/1990 | Chevalier et al. | |
| 5,215,818 A | 6/1993 | Silver et al. | |
| 5,350,797 A | 9/1994 | Stephan et al. | |
| 5,444,112 A | 8/1995 | Carnahan | |
| 5,455,293 A | 10/1995 | Wood et al. | |
| 5,470,425 A | 11/1995 | Discho | |
| 5,543,455 A | 8/1996 | Shah | |
| 5,565,511 A | 10/1996 | Braud et al. | |
| 5,567,750 A | 10/1996 | Schulze et al. | |
| 5,721,302 A | 2/1998 | Wood et al. | |
| 5,931,354 A * | 8/1999 | Braud et al. | 222/394 |
| 5,994,438 A | 11/1999 | Geissler et al. | |
| 6,056,213 A * | 5/2000 | Ruta et al. | 239/337 |
| 6,075,078 A | 6/2000 | Braud et al. | |
| 6,084,018 A | 7/2000 | Wildburg et al. | |
| 6,140,400 A | 10/2000 | Figge et al. | |
| 6,169,132 B1 | 1/2001 | Fickeisen et al. | |
| 6,176,285 B1 | 1/2001 | Gerresheim et al. | |

(Continued)

FOREIGN PATENT DOCUMENTS

WO    WO9812248    3/1998

*Primary Examiner*—Kelechi C Egwim
(74) *Attorney, Agent, or Firm*—Gardner Groff Greenwald & Villanueva, PC

(57) ABSTRACT

An adhesive composition of between 10-70% by weight of a latex emulsion, between 30-80% by weight of an acrylic, between 0.05-5% by weight of a surfactant, and between 1-50% by weight of water, and an adhesive application system for applying the adhesive composition having the adhesive, a propellant, a pressure container for containing the adhesive and the propellant under pressure, and a valve system to regulate the flow of the adhesive and propellant out of the pressure container.

37 Claims, 2 Drawing Sheets

U.S. PATENT DOCUMENTS

| | | |
|---|---|---|
| 6,207,446 B1 | 3/2001 | Szostak et al. |
| 6,281,344 B1 | 8/2001 | Szostak et al. |
| 6,416,950 B1 | 7/2002 | Lohse et al. |
| 6,440,259 B1 | 8/2002 | Patel |
| 6,541,550 B1 | 4/2003 | McCarthy et al. |
| 6,552,120 B1 | 4/2003 | Harzschel et al. |
| 6,566,421 B1 | 5/2003 | West |
| 6,593,421 B2 | 7/2003 | Christie et al. |
| 6,616,798 B2 | 9/2003 | Koehler et al. |
| 6,667,352 B1 | 12/2003 | Kusters et al. |
| 6,800,682 B1 | 10/2004 | Windhoevel et al. |
| 6,803,100 B1 | 10/2004 | Hintz et al. |
| 6,852,812 B2 | 2/2005 | Betremieux et al. |
| 6,890,975 B2 | 5/2005 | Weitzel |
| 6,896,205 B2 | 5/2005 | Purvis et al. |
| 7,070,653 B2 | 7/2006 | Frost et al. |
| 2002/0069965 A1 | 6/2002 | Koehler et al. |
| 2002/0086176 A1 | 7/2002 | Brodeur, Jr. et al. |
| 2002/0127374 A1 | 9/2002 | Spratling |
| 2002/0177655 A1 | 11/2002 | Pratt et al. |
| 2002/0182404 A1 | 12/2002 | Brodeur, Jr. et al. |
| 2003/0055150 A1 | 3/2003 | Betremieux et al. |
| 2003/0065089 A1 | 4/2003 | Betremieux et al. |

\* cited by examiner

WATER BASED AEROSOL ADHESIVE

CROSS REFERENCE TO RELATED APPLICATION

This application is a continuation of U.S. patent application Ser. No. 10/474,384, filed Oct. 9, 2003, which claims priority to U.S. Provisional Patent Application Ser. No. 60/282,712 filed Apr. 10, 2001. The contents of each application are incorporated herein by reference.

BACKGROUND OF THE INVENTION

1. Technical Field

The present invention generally relates to the field of water-based adhesives and more specifically relates to the field of high solids content, with no or minimal volatile organic compounds (VOC), adhesives suitable for packaging in pressurized containers to be later sprayed. The present invention further generally relates to the field of adhesive application systems and more specifically relates to the field of adhesive application systems comprising a pressurized container containing the adhesive and a propellant.

2. Prior Art

Traditional adhesive systems for packaging into a pressurized container such as an aerosol can or propane type cylinder, have been solvent-based compounds because of good solubility, low cost, solvency in standard pressure propellant systems such as propane, butane, and isobutene compounds and blends thereof, and in some cases high pressure propellant systems such as nitrogen and carbon dioxide. The majority of these traditional systems usually contain at least some VOCs or some level of flammability. Solvent-based systems also usually carry with them a number of undesirable health hazards, environmental concerns, or even the possibility of being explosive in nature. As local, state and national governmental regulations have been tightening the requirements for adhesives and other chemical-based products to contain less VOCs and to be more environmentally friendly, it has become almost necessary to research more environmentally friendly alternatives to adhesives.

Pressurized adhesive systems also have been developed using compressed air to atomize and spray the adhesive. These compressed air systems necessitate additional expense for spraying equipment, are bulky, and can be difficult to transport or clean up. Water-based systems also have been developed that incorporate traditional adhesive and propellant properties. However, incompatibility issues have arisen between the adhesive and the propellant system necessitating the need to use additional high-pressure propellants, which add a greater degree of danger, to obtain proper spray patterns or to get the adhesive to properly and completely spray out of the container. Coverage of these spray systems is only slightly better than the existing system of spreading the adhesive on the flooring surface with a trowel or other such device. Furthermore, these self-contained pressurized systems only can be packaged in a propane type cylinder that is designed for pressures up to 220-250 psi. Because of these high-pressure requirements, that type of system cannot be packaged into a traditional aerosol container.

Typical water-based latex emulsions also are used, but with limited success in a self-contained sprayable system. Also, the typical non-sprayable, and in some cases sprayable with non self-contained systems, adhesive market generally has been divided into two major categories. The first category comprises water-based emulsions based upon styrene butadiene rubber (SBR) latex for adhering materials such as general floor covering to wood, fiberglass or concrete surfaces and other like applications, and are less costly than other systems. These SBR-based systems are more common. The second category comprises acrylic-based formulas for mostly pressure sensitive applications. These acrylic-based systems typically are more costly.

Thus, it can be seen that there exists a need for an adhesive that can be applied to a surface using a low- or medium-pressure delivery system. There exists a further need for an adhesive that has a high solids content for superior adhesion qualities. There exists another need for an adhesive that has better water resistance when dry and a greater immunity to high alkalinity. There exists an additional need for an adhesive that contain no or minimal VOCs. It is to these exemplary needs, as well as other needs, that the present invention is directed.

BRIEF SUMMARY OF THE INVENTION

The present invention is an adhesive and a delivery system for the adhesive. The adhesive utilizes a blend of styrene butadiene rubber (SBR) and acrylic, thus eliminating the need for process oils, tackifying resins, or harmful or hazardous solvents. Surfactants are added to achieve the blending and maintain the stability of the SBR and acrylic blend. The adhesive delivery system comprises the adhesive packaged together with a propellant in a pressurized container such as a traditional steel or aluminum aerosol can or a steel pressure cylinder. The system has been designed to operate with a single standard pressure propellant system in the 30-160 psi range.

Some features of the invention include a water-based high solids adhesive that provides superior coverage when compared to other adhesives currently available. The adhesive properly mixes with the selected propellant not only to successfully empty the adhesive from the container, but also for the adhesive to coexist with the selected propellant so as to form a foaming action as the adhesive/propellant mixture comes into contact with the atmosphere of the room. This foaming action creates a stable bubble structure of the adhesive so as to achieve greater coverage and superior bonding strength. Further, the invention is water-based, has minimal or no VOCs, has superior water-resistant properties when dry, and dries faster than the prior art water-based adhesives.

These features and other features, advantages and objects of the present invention will become readily apparent to those of ordinary skill in the art when the following detailed description of the preferred embodiments is read in conjunction with the accompanying drawings in which like reference numerals represent like components throughout the views.

DETAILED DESCRIPTION OF THE PREFERRED EMBODIMENTS

Figure 1:
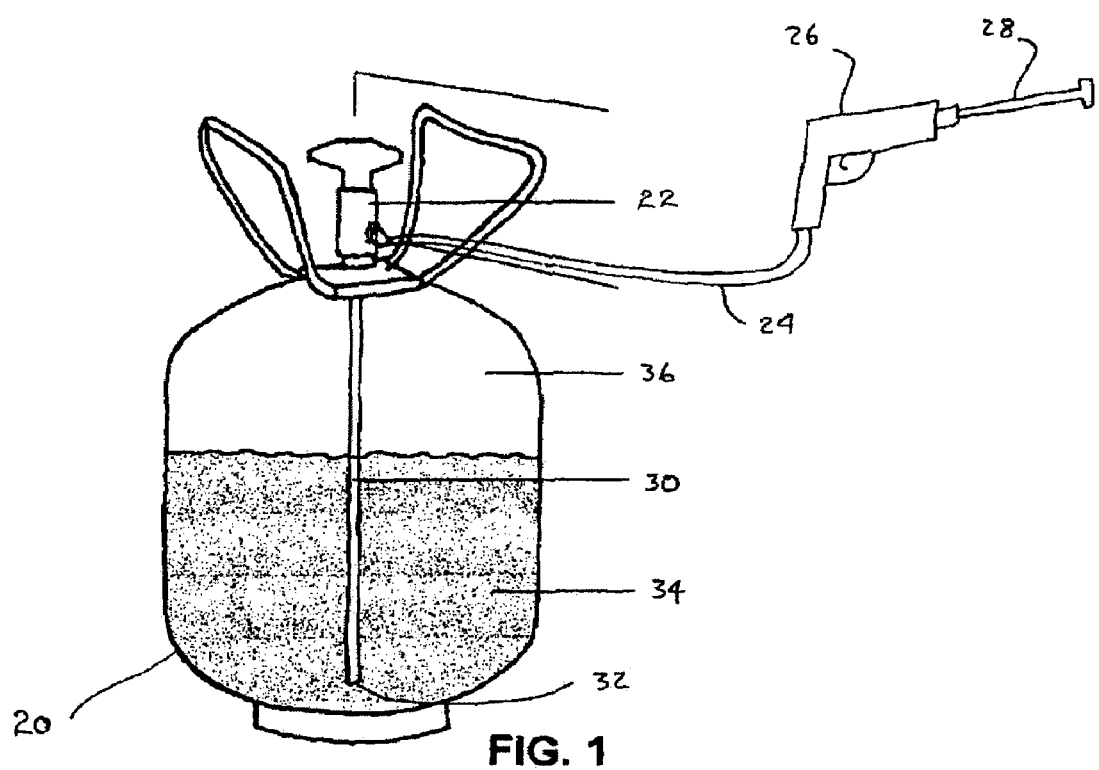
FIG. 1 is a sectional side view of a first application system of the present invention.

Generally speaking, this invention comprises a high density adhesive and converts the high density adhesive to a low-density coating by expelling the high density adhesive through a spray apparatus. The low-density coating then converts back into a high density adhesive by bonding with another surface or substrate upon the application of pressure.

An adhesive composition and a method of producing an adhesive composition are disclosed herein whereby a water-based emulsified acrylic is blended with a styrene butadiene rubber (SBR), stabilizers, and fillers, doing so without the use of volatile organic compounds (VOC). The resulting adhesive is a fast-drying, high solids content adhesive and a method for applying the adhesive.

The method for producing the adhesive takes advantage of using polymers without using processing oils and hydrocarbon resins. Additionally, the adhesive product of this invention is fully compatible with a common single propellant system, such as those using a chlorofluorocarbon, is non-flammable, contains minimal or no VOCs, is non toxic, offers excellent water-resistance once dry, and is a low to standard (as known in the relevant field) pressure (30-120 psi) aerosolized system. The adhesive product of this invention can be packaged in an industry standard aerosol can or propane type cylinder and is sprayed through a suitable valve system and nozzle.

The adhesive system of this invention blends a high density adhesive with a propellant system, which then can be sprayed out in the form of a low-density coating. Upon coating a material or substrate, the low-density coating then returns to its original density upon the application of pressure. The conversion of the adhesive from high density to low density is achieved when the adhesive is sprayed out in a uniform manner on the surface, forming a stable bubble structure. The bubble structure maintains and retains a low-density coating of adhesive until another substrate is applied with pressure. The bubble structure allows far greater surface coverage than traditional adhesives and excellent, if not superior, bonding strength for many laminates such as, for example purposes only, natural or synthetic fabric or textiles, wood, plastic, vinyls, Formica, metals, rubber, fiberglass, concrete, paper, glass, wall covering materials, and many more surfaces. This invention also is designed for adhering flooring materials such as, for example purposes only, carpet, linoleum, vinyl composite tiles, ceramic tiles, artificial grass, wood, marble and other such materials that exist for floor covering and apply them to such substrates as wood, concrete and others.

The adhesive and system of the present invention is non-traditional in that it does not take advantage of existing adhesive technology, especially in the floor covering industry, is non-flammable, does not constitute a health hazard, uses water as the primary solvent, and uses a single standard pressure propellant system. The adhesive and system utilizes new adhesive technology to achieve superior coverage in that it obtains up to two times or more of the coverage of the prior art by using a stable bubble structure technology combined with a low density coating of the adhesive on the substrate. This bubble structure allows for the need to apply less adhesive to the surface, thus reducing the amount of adhesive soaking into the surface, while yielding superior strength once the adhesive has dried.

Furthermore, the adhesive becomes highly water-resistant when dry, which is a benefit that the prior art does not have. An additional advantage is a resistance to adhesive breakdown when adhered to high alkaline substrates such as concrete. Another advantage to this adhesive is a greatly improved open time before bonding occurs. This open time can exceed 30 days, but average applications will leave an open time of no more than 12 hours. A further advantage of this invention is once the adhesive is allowed to tack and the material that is to be bonded is set in place with pressure, there is no slip or tendency to curl back up from the adhered surface. High traffic on the bonded surface improves the performance of this adhesive system, whereas high traffic causes traditional adhesives to break down or weaken. A further advantage of this system is that it can be packaged in a traditional aerosol container with pressures ranging from 30-160 psi. The adhesive has been designed to completely empty its contents at this pressure range.

The adhesive has been designed to be used in a delivery system having a single standard pressure propellant system of between 30-160 psi. At this pressure, the adhesive should spray out completely. The preferred internal container pressure is between 25-160 psi at 72° F., more preferably between 60-120 psi at 72° F., and even more preferably between 65-80 psi at 72° F. While any pressure vessel can be suitable, the preferred pressure vessels are those similar to the common propane cylinder and the common aerosol can. The preferred spray out pressure fluctuation is between 0-60 psi at 72° F., and more preferably between 0-10 psi at 72° F.

1. Adhesive.

Generally, the adhesive is an SBR and acrylic blend that has a viscosity suitable for spray applications, is stable in common pressurized vessels, and can be used in aerosol spray applications. The adhesive also is compatible and not adversely affected by a propellant system such as, for example, 1-1-1-2 tetrafluoroethane, commonly referred to as HFC 134A. Similarly, the adhesive remains stable both in chemistry and in pressure during the spray out of the pressurized container, will not clog the nozzle, and is non-flammable. The adhesive is formulated to be compatible with a single propellant system operating at pressures of between 30-160 psi.

The adhesive portion of this invention is non-traditional in nature in that it is high in solids and utilizes a novel blend of SBR and acrylic. This blend eliminates the need for process oils, tackifying resins, or harmful or hazardous solvents including those that contain VOCs. One reason that this SBR/acrylic blend is novel is that the adhesives industry generally has thought and taught that SBRs and acrylics are not compatible. This invention uses one or more surfactants to achieve this successful and extraordinary blend and to keep it stable. Additional benefits of this novel formulation yield very fast drying times that are not common to typical water-based formulas, superior bonding strength, superior and extraordinary adhesive coverage that rivals other traditional formulations, resistance to high-alkalinity breakdown, and excellent water-resistance once the adhesive is dry.

This adhesive formulation is compatible with a propellant such as HFC 134A (1-1-1-2 tetrafluoroethane), which is a non-polluting and non-flammable propellant. Further, this adhesive formulation maintains a consistent spray pattern until the adhesive contents are fully emptied form the container, while maintaining a pressure of between 30-160 psi. Although HFC 134A is a preferred propellant, this invention is not limited to that particular propellant, and can take advantage of other available propellant systems or propellant blends that may be filed as one part (or step or stage) and all those similar in function and chemistry to HFC 134A.

More specifically, but for illustrative purpose only, a preferred embodiment of the adhesive comprises:

| Component | Weight % Range | Preferred Weight % |
|---|---|---|
| Latex Emulsion | 10-70 | 10-40 |
| Acrylic | 30-80 | 30-60 |
| Surfactant | 0.05-5 | 0.1-2 |
| Stabilizer | 0.5-10 | 0.1-1 |
| Defoamer | 0.05-5 | 0.5-1 |

-continued

| Component | Weight % Range | Preferred Weight % |
| --- | --- | --- |
| Filler | 5-30 | 5-20 |
| Water | 1-50% | 10-40 |

Suitable latex emulsions include but are not limited to SBR, acrylic, nitrile, neoprene, vinyl acetate, ethylene vinyl acetate copolymers, carboxylated SBR, etc. or blends thereof, may be used depending upon the type of material being used and the substrate to which the material is being bonded. More specifically, commercially available latex emulsion, such as, for example, Intex 131 and 132 available from Enichem America; LPF 5356, LPH 6733, LPH 6687, all available from Goodyear; Butafan 125 and 104, available from BASF Corporation; and Polytex 425, available from Rohm and Haas Corp. While SBR latex emulsions are specified herein, it is understood that various latex emulsions, such as, for example, acrylic homopolymers or copolymers, acrylonitrile butadiene (NBR), polychloroprene (neoprene), vinyl acetates, ethylene vinyl acetate copolymers, carboxylated SBR, etc., or blends thereof, may be used depending upon the materials being applied, the substrate to which the materials are bonded and the environmental conditions in which the bond will be present.

It is to be understood that the invention is not limited to any particular latex emulsion, SBR, acrylic, natural rubber compound, neoprene, vinyl, nitrile, styrene, cellulose, butyl rubber, polyurethane, polymer, carboxylated materials, or combinations thereof. A wide variety of materials can be substituted for the preferred materials without departing from the scope of the adhesive.

Suitable acrylics include, but are not limited to all acrylic emulsions. Preferred acrylics include Air Products Flexcryl Emulsions FLGP25, FLGP5, FLLC14, FLLC50, FLSL23, and FL2585; BASF Acronal V-275 acrylic vinyl acetate copolymer emulsion, Acronal 81D, A-220, 34-32, and S400.

Suitable surfactants include, but are not limited to conventional surfactants. Preferred surfactants include soaps, Rohm & Haas Triton B non-ionic X-180 ans X-193; Albright & Wilson Ltd. Empilan MAA fatty acid non-ionic and NP-S non-ionic; and Cognis Corporation Mod-S fatty acid.

Suitable stabilizers include, but are not limited to basic pH materials, such as, for example, caustic soda, caustic potash, ammoniated tallow, dimethyl amine, dimethyl amine, ammonia, dimethyl amino ethanol, urea, dicthanol amine, triethanol amine, morpholine, etc. By buffering the latex emulsion in this manner, the emulsion is made stable and is ready to be mixed with the additional constituent components to form a stable high solids adhesive. The choice of buffering agent depends upon the latex emulsion or combination of emulsions used. The preferred illustrative stabilizer is potash KOH 45%.

Suitable defoamers include, but are not limited to Foamkill 600 Series, available from Crucible Chemical; Foammizer M-55, available from C. P. Hall; and Nalco 5770 and 5772, available from Nalco Chemical, etc. A bactericide, such as, for example, Amerstate 251, available from Drew Chemical, may be added to reduce foaming and microbial contamination.

Suitable fillers include, but are not limited to clays. The preferred illustrative filler is RC-32 clay slurry. Care should be taken not to raise the viscosity to a level that will prevent the use of the adhesive in aerosol form, or in a pressurized canister dispenser.

The adhesive is prepared by blending the components to a consistency that produces a solids content of from 50-80%.

The adhesive preferably has a viscosity of between 800-1200 centipoise and a preferred pH of between 7-10.9, and more preferably between 8-9.

Forming the adhesive in this manner provides an adhesive having the qualities and characteristics previously described. Various blends are contemplated for use in various applications. Further, the adhesive can be used effectively on concrete or other surfaces having a high pH factor, such as 12 or higher.

Once the adhesive is prepared, it is placed into the delivery system, as disclosed in the next section, along with the selected propellant.

2. Delivery System.

A preferred delivery system for this adhesive is a self-contained, portable, pressurized container, thus avoiding spreading the adhesive by brush, trowel, pouring, or using cumbersome air pressure systems or other high-pressure propellant systems to spray the adhesive. A preferred delivery system for this adhesive also does not contain a flammable solvent or propellant, since many applications call for delivering the adhesive in an enclosed environment, such as inside of a building or in other limited situations, in which a potentially explosive environment could develop.

The invention contemplates the use of an adhesive application system that includes a sprayable water-based adhesive composition that is readily susceptible of being pressurized and sprayed by non-flammable, non-polluting propellants. The adhesive is packaged together with a propellant in a pressurized container. Suitable containers include, but are not limited to the traditional steel or aluminum aerosol can and the traditional pressure tank, such as is typically used with natural gas or refrigerant storage.

Figure 2:
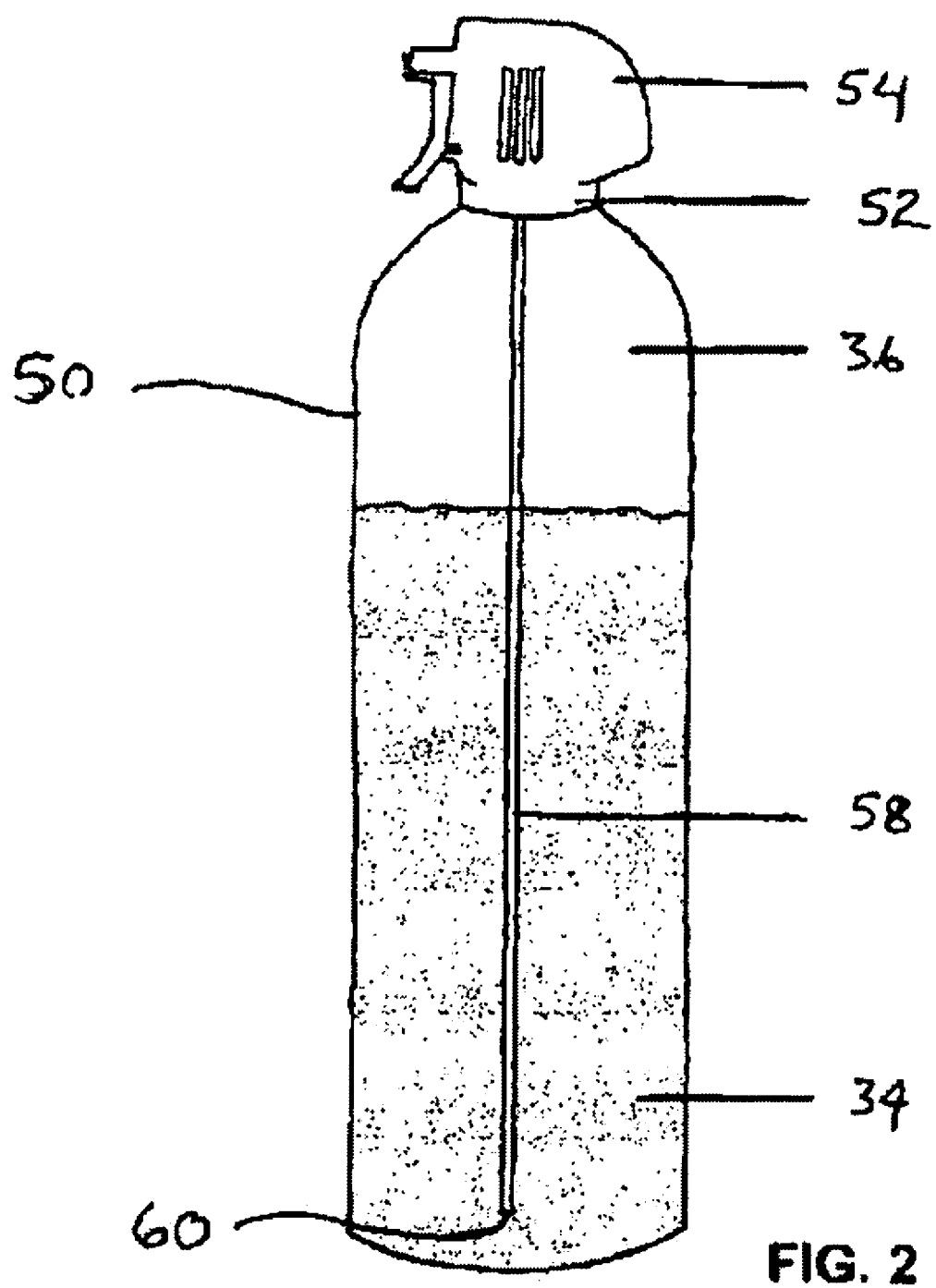
FIG. 2 is a sectional side view of a second application system of the present invention.

Referring now to FIGS. 1 and 2, preferred delivery systems are shown in schematic detail.

FIG. 1 includes a cylinder 20 designed for containing pressure, such as is used for propane transport and a discharge valve 22 of conventional design. A pressure hose 24 is attached to the cylinder 20 via a threaded opening in the valve 22. The opposite end of the hose 24 is attached via a threaded fitting to a spray gun 26. The gun 26 may or may not have an extension wand 28 attached. The hose 24 and gun 26 allow for a suitable spray pattern to be achieved.

The cylinder 20 has an internal dip tube 30 attached to the valve 22. The dip tube 30 extends from the valve 22 to a point proximal to the bottom of the cylinder 20. An inlet 32 in the dip tube 30 allows the adhesive 34 to enter the dip tube 30. When the valve 22 is opened, the adhesive 34, under pressure from the propellant 36, is forced into the dip tube 30 and travels through the dip tube 30, through the valve 22, through the hose 24 and out through the gun 26, or wand 28 if present.

FIG. 2 includes an industry standard aerosol can 50 comprising a spray valve 52 and a spray head 54. Typically, this type of can either is a two- or three-piece steel container or a one-piece aluminum container. Although almost any material of construction is acceptable, it is preferable to use a corrosion-resistant material, and especially resistant to corrosion due to water as the preferred adhesive is water-based, such as aluminum. This type of can 50 typically has an open top or bottom through which the adhesive 34 and propellant 36 are loaded, after which the can 50 is sealed or plugged.

The can 50 also has an internal dip tube 58 attached to the valve 52. The dip tube 58 extends from the valve 52 to a point proximal to the bottom of the can 50. An inlet 60 in the dip tube 58 allows the adhesive 34 to enter the dip tube 58. When the valve 52 is opened, the adhesive 34, under pressure from the propellant 36, is forced into the dip tube 58 and travels through the dip tube 58, through the valve 52 and out through the spray head 54.

The adhesive 34 is packaged in the cylinder 20 or can 50 with a pressurized gas that serves as the propellant 36. Some of the propellant 36 remains separate form the adhesive 34, as shown in FIG. 1 and FIG. 2, but some of the propellant 36 is integrated with the adhesive 34. The separate propellant 36 primarily functions to force the adhesive 34 out of the cylinder 20 or can 50. The propellant that is integrated into the adhesive serves as a slight foaming agent for the adhesive 34 so as to establish the bubble structure needed for the adhesive 34 to form a strong bond upon application. More specifically, as the adhesive 34 exits the gun 26, wand 28 or spray head 54, the integrated propellant causes the adhesive 34 to foam slightly, creating bubbles.

In each embodiment of the delivery system, the spray gun 26, extension wand 28, spray head 54 or the equivalent can be selected or structured to provide a desired spray pattern or spray quantity. For example, using larger or a greater number of exit holes (not shown) will allow a greater quantity of adhesive 34 to exit the container 20 or can 50. Similarly, the exit holes can be patterned to provide a patterned spray. For example, if the exit holes are linearly arranged, an elongated spray pattern would be created, while if the exit holes were circularly arranged, a broad spray pattern would be created.

3. Propellant.

Once the adhesive has been filled into the delivery container, the propellant is injected into the container until the selected amount of propellant is added or until the selected cylinder internal pressure is reached. The propellant to adhesive ratio preferably is in the range of 10-70% by weight of adhesive to propellant. The preferred ratio is approximately 65-75% by weight adhesive to propellant; that is approximately 65-75% adhesive to approximately 25-35% propellant by weight. The percentage can vary depending on the exact application for the adhesive to be used.

An illustrative example is a 24-pound finished product capacity container. This container would be filled with 14 pounds of adhesive and 6 pounds of propellant. This particular illustrative example produces about 70-80 psi internal to the container. This particular example has been found to be satisfactory to impart excellent sprayability properties for the adhesive and is a sufficient amount of propellant to allow a consistent psi while spraying, and thus a consistent spray pattern, and to allow a complete spray out of the adhesive form the container.

Suitable propellants include, but are not limited to single propellant systems having a vapor pressure of 30-160 psi at 72° F. 1-1-1-2 tetrafluoroethane (HFC 134A) has been found to be a suitable propellant. Further, the preferred propellants are non-flammable and non-polluting 4. Application to a Surface, Substrate, or Other Material.

The adhesive is sprayed out onto a surface, substrate or other material. The adhesive is sprayed out in low-density form and remains low-density until pressure is applied. The preferred spray density is 1 ounce per 10.5 square feet to 1 ounce to 15.5 square feet. More preferably, the spray density is 1 ounce to 12.5 square feet.

When the adhesive is sprayed out and contacts a surface, the adhesive coats the surface with a bubble structure that remains stable even while drying. This means that the bubble do not break on their own accord even while drying. This bubble structure remains intact until another surface, substrate or other material is applied with pressure, which in turn breaks this bubble structure and forms an adhesive bond. This applied pressure increases the density of the adhesive. The bubbles can be created by the surfactant as it interacts with the propellant, or by the propellant that is integrated with the adhesive as the propellant goes out of solution from the adhesive.

The bubble structure, and more specifically the breaking of the bubble structure upon the application of pressure, forms an aggressive bond between the surfaces. The adhesive bond is created relatively quickly, preventing unwanted shifting of one surface relative to the outer surface. Similarly, the curling of corners of the surfaces upon drying is reduced or eliminated. Furthermore, adding additional pressure using a weighted roller or the like increases the performance of the adhesive. This is contrary to the prior art in which there is a drying time before it is advisable to allow traffic on or over the adhered surfaces.

5. Adhesive Characteristics.

The adhesives have been tested for coverage density, pressure density, we density and foam structure. The adhesive was sprayed under atmospheric conditions of 71.6° F. and 64% humidity. The container with the adhesive was shaken well and the adhesive was sprayed on the sample substrates form a distance of 18-24 inches. A constant spray using a sweeping motion was used to ensure an even coating of the sample surfaces. The sample surfaces used were 4-inch circles of solid, clear and rigid acrylic (plexi-glass) material.

The adhesive delivers an average coverage density of approximately 12.5 $ft^2$/oz, which corresponds to 200 $ft^2$ for a 16-ounce can. The coverage density for the samples ranged from 10.8-13.7 $ft^2$/oz. After the adhesive has been placed, the average wet density of the adhesive is 0.23 lbs/gallon. The wet density for the samples ranged from 0.20-0.25 lbs/gallon. After the adhesive has been placed, dried (for 30 minutes until tacky) and pressure applied (equivalent to a 100 lb stand up roller with a contact area of 12 inches wide with 1 inch being in contact with the surface at all times), the average coverage pressure density of the adhesive is 1.3 lbs/gallon. The coverage pressure density for the samples ranged from 1.1-1.5 lbs/gallon. The wet density of the adhesive in a beaker is 1.1 lbs/gallon. The concentrated material (before manufacture) is 86 lbs/gallon. The foam bubble structure comprises bubbles that range from 10-100 microns in diameter.

6. Uses.

A use for this invention is to provide an adhesive that will adhere carpet, carpet padding, athletic surfaces, vinyl composite tile (VCT), vinyl tile, resilient sheet goods, ceramic tile, wood flooring, synthetic flooring material, cove base, floor covering padding, and other such materials that are used for flooring purposes to flooring surfaces or other suitable substrates. Another use for this invention is to provide an adhesive that will adhere other materials such as Styrofoam, textile fabrics, natural and synthetic fibers, Formica, wood, metals, fiberglass, concrete, sheet rock, masonry materials, plastic, vinyl, glass, leather, rubber, and other such materials to each other or to other materials.

The adhesive system is easily packaged and transported to any location. The larger container 20 structure is more suitable for larger applications, while the smaller can 50 is more suitable for smaller applications.

Other preferred usages for this invention is in general construction, adhering floor covering materials to all substrates, hobbies and crafts, manufacturing, boat construction, mobile home manufacturing, and wall covering installation. Further, the adhesive can be used as a general purpose adhesive, such as for adhering labels, photographs, and the like, as this adhesive does not soak through paper. This adhesive works well both indoors and outdoors.

The invention is not limited to the illustrative applications disclosed herein, but is applicable to many adhesive needs. The particular formulation allows for greater coverage than conventional adhesives and the bubble structure of the sprayed adhesive achieve greater strength to keep adhered surfaces from slipping or sliding relative to each other. This is a significant improvement in adhesive technology in that it allows the user to insure not only a faster job completion but also a better quality job, as the adhered materials remain in place better.

The above description and examples set forth the best mode of the invention as known to the inventors at this time, and is for illustrative purposes only, as one skilled in the art will be able to make modifications to this process without departing from the spirit and scope of the invention and its equivalents as set forth in the appended claims.

The invention claimed is:

1. A composition comprising a propellant and an adhesive in a container, wherein the adhesive comprises an acrylic and water,
   wherein the composition contains no volatile organic compound, and
   the propellant comprises a non-flammable and non-polluting fluorocarbon, wherein the amount of fluorocarbon is greater than or equal 23% by weight of the composition and produces an internal pressure from 30 to 160 psi at 72° F.

2. The composition of claim 1, wherein the internal pressure of the container is between 60 to 120 psi at 72° F.

3. The composition of claim 1, wherein the internal pressure of the container is between 65 to 80 psi at 72° F.

4. The composition of claim 1, wherein the propellant is 1, 1, 1, 2-tetrafluoroethane.

5. The composition of claim 1, wherein the adhesive is from 10 to 77% by weight of the composition.

6. The composition of claim 1, wherein the adhesive is from 65 to 77% by weight of the composition and the propellant is from 23% to 35% by weight of the composition.

7. The composition of claim 1, wherein the adhesive is from 30 to 60% by weight acrylic.

8. The composition of claim 1, wherein the adhesive further comprises a non-ionic surfactant.

9. The composition of claim 8, wherein the surfactant comprises a fatty acid.

10. The composition of claim 8, wherein the surfactant is from 0.05 to 5% by weight of the adhesive.

11. The composition of claim 8, wherein the surfactant is from 0.1 to 2% by weight of the adhesive.

12. The composition of claim 1, wherein the adhesive further comprises an anionic surfactant.

13. The composition of claim 1, wherein the surfactant comprises a sulfonated fatty acid.

14. The composition of claim 1, wherein the composition further comprises a stabilizer, a defoamer, a filler, or any combination thereof.

15. The composition of claim 14, wherein the stabilizer comprises caustic soda, caustic potash, ammoniated tallow, dimethyl amine, dimethyl amine, ammonia, dimethyl amino ethanol, urea, diethanol amine, triethanol amine, or morpholine.

16. The composition of claim 14, wherein the defoamer comprises controlling agents and chemical compositions for the reduction of foaming.

17. The composition of claim 14, wherein the filler is clay.

18. The composition of claim 1, wherein the adhesive comprises a solids content of 50 to 80%.

19. The composition of claim 1, wherein the adhesive has a viscosity of 800 to 1200 centipoise at a temperature of approximately 72° C.

20. The composition of claim 1, wherein the adhesive has a pH of 7 to 10.9.

21. The composition of claim 1, wherein the adhesive has a pH of 8 to 9.

22. The composition of claim 1, wherein the propellant is greater than or equal to 25% by weight of the composition.

23. The composition of claim 1, wherein the propellant is 30 to 90% by weight of the composition.

24. The composition of claim 1, wherein the propellant is from 25% to 35% by weight of the composition.

25. The composition of claim 1, wherein the acrylic comprises two or more acrylics.

26. The composition of claim 1, wherein the acrylic comprises an acrylic homopolymer or copolymers.

27. The composition of claim 1, wherein the acrylic comprises an acrylic vinyl acetate copolymer, an acrylonitrile polymer, an acrylic/acrylonitrile copolymer, or an acrylonitrile/styrene copolymer.

28. The composition of claim 1, wherein the acrylic comprises an acrylic vinyl acetate copolymer emulsion.

29. The composition of claim 1, wherein when the composition is released from the container, the pressure fluctuation is from 0 to 60 psi at 72° F.

30. The composition of claim 1, wherein when the composition is released from the container, the pressure fluctuation is from 0 to 10 psi at 72° F.

31. The composition of claim 1, wherein when the propellant comprises a single propellant.

32. A spraying device comprising the composition of claim 1.

33. A method for adhering an article to a substrate, comprising (a) applying the adhesive of claim 1 to the surface of the substrate to produce a coated substrate and (b) applying the article to coated substrate.

34. The method of claim 33, wherein the article comprises carpet, carpet padding, athletic surfaces, vinyl composite tile (VCT), vinyl tile, resilient sheet goods, ceramic tile, wood flooring, synthetic flooring material, cove base, or floor covering padding.

35. The method of claim 33, wherein the substrate comprises Styrofoam, textile fabrics, natural and synthetic fibers, Formica, wood, metals, fiberglass, concrete, sheet rock, masonry materials, plastic, vinyl, glass, leather, or rubber.

36. The method of claim 33, wherein the acrylic comprises an acrylic vinyl acetate copolymer emulsion and the article comprises ceramic tile.

37. A composition comprising a propellant and an adhesive in a container, wherein the adhesive comprises (1) an acrylic comprising an acrylic vinyl acetate copolymer, an acrylonitrile polymer, an acrylic/acrylonitrile copolymer, or an acrylonitrile/styrene copolymer, (2) and water,
   wherein the composition contains no volatile organic compound, and the amount of propellant is greater than or equal 23% by weight of the composition and produces an internal pressure from 30 to 160 psi at 72° F.

* * * * *